US011216732B2

(12) United States Patent
Zlateski et al.

(10) Patent No.: US 11,216,732 B2
(45) Date of Patent: *Jan. 4, 2022

(54) SYSTEMS AND METHODS FOR GENERATION OF SPARSE CODE FOR CONVOLUTIONAL NEURAL NETWORKS

(71) Applicant: Neuralmagic inc., Somerville, MA (US)

(72) Inventors: Aleksandar Zlateski, Somerville, MA (US); Justin Kopinsky, Cambridge, MA (US)

(73) Assignee: NEURALMAGIC INC., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/178,603

(22) Filed: Feb. 18, 2021

(65) Prior Publication Data

US 2021/0182676 A1    Jun. 17, 2021

Related U.S. Application Data

(63) Continuation of application No. 16/751,953, filed on Jan. 24, 2020, now Pat. No. 10,963,787, which is a
(Continued)

(51) Int. Cl.
*G06N 3/08* (2006.01)
*G06N 20/10* (2019.01)
*G06K 9/62* (2006.01)

(52) U.S. Cl.
CPC ............. *G06N 3/08* (2013.01); *G06K 9/6256* (2013.01); *G06N 20/10* (2019.01)

(58) Field of Classification Search
CPC .. G06F 8/30; G06F 17/16; G06N 3/08; G06N 20/10
(Continued)

(56) References Cited

U.S. PATENT DOCUMENTS 5,577,166 A    11/1996  Mizuno
9,367,519 B2*   6/2016  Strauss ................... G06F 17/16
(Continued)

FOREIGN PATENT DOCUMENTS

EP          3 037 980        6/2016
WO    WO 2017/049496        3/2017
(Continued)

OTHER PUBLICATIONS

Raphael Yuster et al. "Fast sparse matrix multiplication" 12th Annual European Symposium on Algorithms (ESA'04).*
(Continued)

*Primary Examiner* — Francisco J Aponte
(74) *Attorney, Agent, or Firm* — Pearl Cohen Zedek Latzer Baratz LLP

(57) ABSTRACT

A system and method may generate code to be used when executing neural networks (NNs), for example convolutional neural networks (CNNs) which may include one or more convolutional layers. For at least one convolutional layer, for each non-zero element in a kernel tensor or matrix associated with the convolutional layer, instructions may be generated or issued. For example, for each non-zero element, a vector broadcast instruction may be generated, and a fused multiply-add (FMA) instruction may be generated, having as parameters a register representing a portion of the output for the convolutional layer, a register storing input data for the convolutional layer, and a register or reference to memory storing the non-zero element. The software or code produced may be executed during convolutional operations, for example as part of a larger application such as a NN inference application.

20 Claims, 6 Drawing Sheets

Related U.S. Application Data continuation of application No. PCT/US2019/063678, filed on Nov. 27, 2019, application No. 17/178,603, which is a continuation-in-part of application No. 16/426,609, filed on May 30, 2019.

(60) Provisional application No. 62/900,933, filed on Sep. 16, 2019, provisional application No. 62/678,757, filed on May 31, 2018.

(58) Field of Classification Search
USPC .......................................................... 717/108
See application file for complete search history.

(56) References Cited

U.S. PATENT DOCUMENTS

| | | | |
|---|---|---|---|
| 9,558,156 | B1 | 1/2017 | Bekas et al. |
| 9,811,775 | B2 | 11/2017 | Krizhevsky et al. |
| 9,818,059 | B1 | 11/2017 | Woo et al. |
| 10,157,045 | B2 | 12/2018 | Venkataraman et al. |
| 10,489,480 | B2 * | 11/2019 | Akerib .................... G06F 17/16 |
| 10,528,864 | B2 * | 1/2020 | Dally .................... G06N 3/0454 |
| 10,572,568 | B2 | 2/2020 | Narayanamoorthy et al. |
| 10,685,082 | B2 | 6/2020 | Bekas et al. |
| 10,719,323 | B2 | 6/2020 | Baum et al. |
| 10,706,498 | B2 * | 7/2020 | Nurvitadhi ............. G06N 3/084 |
| 10,936,311 | B1 * | 3/2021 | Liu .................... G06F 9/30036 |
| 10,943,325 | B2 * | 3/2021 | Nurvitadhi ............. G06F 17/16 |
| 11,080,046 | B2 * | 8/2021 | Kaul ....................... G09G 5/393 |
| 11,080,811 | B2 * | 8/2021 | Appu .................... G06F 9/3017 |
| 2010/0076915 | A1 | 3/2010 | Xu et al. |
| 2013/0138589 | A1 | 5/2013 | Yu et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 * | 12/2016 | Chung ................ G06F 15/7803 706/26 |
| 2017/0103313 | A1 | 4/2017 | Ross et al. |
| 2017/0103317 | A1 | 4/2017 | Young |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0372202 | A1 | 12/2017 | Ginsburg et al. |
| 2018/0032312 | A1 * | 2/2018 | Hansen ................. G06F 7/5443 |
| 2018/0046900 | A1 | 2/2018 | Dally et al. |
| 2018/0253402 | A1 | 9/2018 | Redfern et al. |
| 2018/0315158 | A1 * | 11/2018 | Nurvitadhi ............ G06F 9/3017 |
| 2018/0315159 | A1 | 11/2018 | Ould-Ahmed-Vall et al. |
| 2018/0322390 | A1 | 11/2018 | Das et al. |
| 2019/0042250 | A1 | 2/2019 | Anders et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0303743 | A1 | 10/2019 | Venkataramani et al. |
| 2019/0354894 | A1 | 11/2019 | Lazovich et al. |
| 2019/0370071 | A1 | 12/2019 | Matveev et al. |
| 2019/0370644 | A1 | 12/2019 | Kenney et al. |
| 2020/0034710 | A1 | 1/2020 | Sidhu et al. |
| 2020/0104717 | A1 | 4/2020 | Alistarh |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |

FOREIGN PATENT DOCUMENTS

| | | |
|---|---|---|
| WO | WO 2018/053835 | 3/2018 |
| WO | WO 2019/090325 | 5/2019 |
| WO | WO 2020/046859 A1 | 3/2020 |
| WO | WO 2020/047823 A1 | 3/2020 |
| WO | WO 2020/072274 A1 | 4/2020 |

OTHER PUBLICATIONS

Alwani et al., "Fused-layer CNN accelerators", 49th Annual IEEE/ACM International Symposium on Microarchitecture (MICRO), 2016, pp. 1-12.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Network Inference on GPUs." From Jul. 2017 "Conference '17", Apr. 3, 2019 (Apr. 3, 2019) Retrieved on Jan. 17, 2020 (Jan. 17, 2020) from <https://arxlv.org/pdf/1802.10280.pdf> entire document.

Despande, Adit, "A beginner's guide to understanding convolutional neural networks", Jul. 20, 2016, retrieved from https://adeshpande3.github.io/A-Beginner%27s-guide-to-understanding-convolutional-neural-networks/ entire document.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Georganas et al., "Anatomy of High-Performance Deep Learning Convolutions on SIMD. Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.org/pdf/1808.05567.pdf> entire document.

Gong et al. "SparseTrain: Leveraging Dynamic Sparsity in Training DNNs on General-Purpose SIMD Processors"; 2019—arxiv.org.

Han et al., "Learning both Weights and Connections for Efficient Neural Networks", 2015, Advances in Neural Information Processing Systerns, vol. 28.

Hinton el al., "Distilling the Knowledge in a Neural Network", Mar. 9, 2015, arXiv:1503.02531v1.

Kaya et al., "Scalable sparse tensor decompositions in distributed memory systems", SC'15: Proceedings of the International Conference for High Performance Computing, Networking, Storage and Analysis, IEEE, 2015 (Year 2015).

Kim et al., "Designing Vector-Friendly Compact BLAS and LAPACK Kernels", SC17, Nov. 12-17, 2017, Denver, CO, USA.

Kurtz et al. "Inducing and Exploiting Activation Sparsity for Fast Neural Network Inference." Proceedings of the International Conference on Machine Learning. 2020.

Lavin et al., "Fast Algorithms for Convolutional Neural Networks", Nov. 10, 2015, arVix:1509.09308v2.

Lascorz et al., "Bit-Tactical: Exploiting Ineffectual Computations in Convolutional Neural Networks: Which, Why, and How", Mar. 9, 2018, arXiv:1803.03688v1.

Lecun et al., "Optimal brain damage", Advances in neural information processing systems, 1990, pp. 598-605.

Li et al., "A CPU-based Algorithm for Traffic Optimization Based on Sparse Convolutional Neural Networks", 2017 IEEE 30th Canadian Conference on Electrical and Computer Engineering (CCECE).

Lim, Robert; "Methods for Accelerating Machine Learning in High Performance Computing", University of Oregon—Area—Jan. 2019.

Liu et al., "Sparse Conolutional Neural Networks", CVPR 2015—Computer Vision Foundation—IEEE.

Liu et al., "Sparse convolutional neural networks", In: Proceedings of the IEEE Conference on Computer Vision and Pattern Recognition. Jun. 12, 2015 (Jun. 12, 2015) Retrieved on Jan. 17, 2020 (Jan. 17, 2020) from <http://openaccess.thecvf.com/content_cvpr_2015/papers/Liu_Sparse_Convolutional_Neural_2015_CVPR_paper.pdf> entire document.

Mishra et al., "Apprentice: Using Knowledge Distillation Techniques to Improve Low-Precision Network Accuracy", Nov. 15, 2017, arXiv.1711.05852v1.

Mostafa et al., "Parameter Efficient Training of Deep Convolutional Neural Networks by Dynamic Sparce Reparameterization", Proceedings of the 36th International Conference on Machine Learning, Long Beach, California, PMLR 97, 2019.

Nisa et al., "Sampled Dense Matrix Multiplication for High-Performance Machine Learning"; 2018 IEEE 25th International Conference on High Performance Computing (HiPC).

(56) References Cited

OTHER PUBLICATIONS

Papyan et al., "Convolutional neural networks analyzed via convolutional sparse coding." In: The Journal of Machine Learning Research. Jul. 17, 2017 (Jul. 17, 2017) Retrieved Feb. 20, 2020 from <http://www.jmlr.ora/papers/volume18/16-505/16-505.pdf> entire document.

Paixiao et al., Matrix compression methods. No. e1049. PeerJ PrePrints, 2015.

Park et al. "Faster cnns with direct sparse convolutions and guided pruining." arViv preprint arXiv:1608.01409 (2016).

Rusu et al., "Progressive Neural Networks", Sep. 7, 2016, arXiv:1606.04671v3.

Scardapane et al. "Group sparse regularization for deep neural networks.", In: Neurocomputing. Jul. 2, 2016 (Jul. 2, 2016) Retrieved on Nov. 16, 2019 (Nov. 16, 2019) from <https://arxiv.org/pdf/1607.00485.pdf> entire document.

Smith et al., "SPLATT: Efficient and parallel sparse tensor-matrix multiplication", 2015 IEEE International Parallel and Distributed Processing Symposium, IEEE, 2015, (Year: 2015).

Wozniak et al., "GiMMiK-Generating bespoke matrix multiplication kernels for accelerators: Application to high-order Computational Fluid Dynamics", Computer Physics Communications, vol. 202, 2016, pp. 12-22.

Yang et al., "Deephoyer: Learning sparser neural network with differentiable scale-invariant sparsity measures." arXiv preprint arXiv:1908.09979 (2019).

Yu et al., "The deep tensor neural network with applications to large vocabulary speech recognition". IEEE Transactions on Audio Speech, and Language Processing 21.2 (2012): 388-396. (Year: 2012).

Yuster et al., "Fast sparse matrix multiplication." ACM Transactions on Algorithms (TALG) 1.1 (2005): 2-13.

McMichael, Justin., "Data Compression: Bit-Packing 101"; <https://www.kinematicsoup.com/news/2016/9/6/data-compression-bit-packing-101 >, published Sep. 6, 2016.

* cited by examiner

SYSTEMS AND METHODS FOR GENERATION OF SPARSE CODE FOR CONVOLUTIONAL NEURAL NETWORKS

CROSS-REFERENCE TO RELATED APPLICATIONS

This application is a continuation of prior U.S. patent application Ser. No. 16/751,953, filed Jan. 24, 2020, entitled "SYSTEMS AND METHODS FOR GENERATION OF SPARSE CODE FOR CONVOLUTIONAL NEURAL NETWORKS", which in turn is a continuation of PCT International Application No. PCT/US2019/063678, International Filing Date Nov. 27, 2019 which in turn claims the benefit of U.S. Patent Application No. 62/900,933, filed Sep. 16, 2019; and this application claims the benefit of U.S. Patent Application No. 62/900,933, filed Sep. 16, 2019, all of which being hereby incorporated by reference. This application is also a continuation-in-part of U.S. application Ser. No. 16/426,609 filed on May 30, 2019 and entitled "SYSTEMS AND METHODS FOR IMPROVED NEURAL NETWORK EXECUTION", which in turn claims benefit from U.S. provisional patent application 62/678,757, filed on May 31, 2018, each incorporated herein by reference in its entirety.

FIELD OF THE INVENTION

The invention relates generally to compiling and executing computer code for operating neural networks; specifically to code for convolutional neural network (CNNs).

BACKGROUND

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. In common NN implementations, the signal at the link between artificial neurons may be for example a real number, and the output of each neuron may be computed by function of the (typically weighted) sum of its inputs, such as the ReLU rectifier function. NN links or edges typically have a weight that adjusts as learning proceeds. The weight increases or decreases the strength of the signal at a connection. Typically, NN neurons are divided or arranged into layers, where different layers may perform different kinds of transformations on their inputs and may have different patterns of connections with other layers. Typically, a higher or upper layer, or a layer "above" another layer, is a layer more towards the input layer, and a lower layer is a layer towards the output layer.

Such systems may learn to perform tasks by considering example input data, generally without being programmed with any task-specific rules, being presented with the correct output for the data, and self-correcting. During learning the NN may execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Various types of NNs exist. For example, a convolutional neural network (CNN) is a deep, feed-forward network, which includes for example one or more convolutional layers, fully connected layers, and pooling layers. CNNs are particularly useful for visual and speech applications. Other NNs include for example long short-term memory (LSTM) networks.

A NN may be modelled as an abstract mathematical object, such as a function. Thus the NN may be "virtual" and no actual physical neurons, links, etc. may exist, these existing rather as data executed by processors. A NN may be translated physically to a CPU (e.g. a traditionally architecture computer, such as a PC) or graphics processing units (GPUs, specialized processors) as for example a sequence of matrix or tensor operations where entries in the matrix or tensor represent neurons and/or links (e.g. artificial neurons connected by edges or links) or other NN parameters and functions carried out on the tensor or matrix represent functions of the NN. GPUs and similar massively parallel hardware devices may be used to provide the large amounts of compute typically needed to train and/or perform inference (e.g. operate or execute at run-time) in NNs. GPUs can have thousands of relatively weak compute cores, small caches, but high memory bandwidth. This contrasts with traditional CPU architectures, that have few powerful cores, very large caches, low memory bandwidth, and have each core executing different instructions at different times in an asynchronous fashion. Input data to a CNN layer may have a number of channels, e.g. RGB (red, blue, green) or more abstract channels such as the output of filters. The output of a CNN layer may be features. A CNN may iterate a patch or tile smaller than the size of the input data across the input data to produce outputs, performing mathematical convolutional operations using the input data and kernel data describing a filter. In a CNN layers may be connected by the application of filters, which are applied repeatedly to patches or tiles of input, and which may be represented as "kernels", or tensors. Typically, in some NN layers, a set of data (e.g. input data to the NN, or intermediate data produced by a NN layer) is multiplied by numbers that are determined by the NN structure, links and weights, and filter or kernel structure of a NN. A filter may be in the context of a convolutional NN layer an operation performed on a subset of input data (e.g. a tile), and a kernel may be the set of fixed data used to multiply against input data to execute a NN.

In both GPU and CPU architectures, the neural network's weights and inputs may be represented as tensors or matrices, and the computation of the network (e.g. the inference or run-time operation) may include a sequence of convolutional calculations of these tensors or matrices. Thus, developing fast NN convolutional calculation algorithms is key to the performance of NNs. Properties of the data structures such as matrices representing the convolutional layers can enable faster convolutional algorithms. One such property is sparsity—a matrix, tensor or data structure is said to be sparse if it contains a lot of entries that are zero (0). While the input matrix or tensor of data to be processed at inference or run time (and the sparsity of the input) is usually out of the network designer's control, the weights of the neural network can be made sparse using a technique called pruning. Among the many parameters in a neural network, a fair fraction are redundant and do not contribute much to the network's output. One may, for example, rank the neurons in the network according to how much they contribute, and then remove the low ranking neurons from the network by setting their matrix or tensor entries to 0. If the process of pruning is done properly, the resulting sparse network, the one where some of the weights are zero, can actually have the same or improved accuracy relative to the original network. The big benefit however, even when some accuracy is lost, is that the resulting network could be smaller and could have a smaller memory footprint with a proper sparse matrix or tensor representation. Computation during the convolutional calculation may be reduced if multiplying by the entries of the data that are zero is avoided.

Not computing the zero elements, when the pattern of zeros is unpredictable, may require executing—e.g. at run-time or inference—a test (e.g. if zero then . . . ) to check if an element is zero, and this "branch" is a costly operation. On a GPU the cost of such a branch is a breaking of the "swarm," the collection of cores that do exactly the same thing. If there is a branch, some cores will do one thing and others another, leading to unreasonably low utilization of the GPUs synchronous SIMD execution style. On a CPU a branch is also a costly instruction.

SUMMARY

A system and method may compile or generate code to be used when executing neural networks (NNs), for example convolutional neural networks (CNNs) which may include one or more convolutional layers.

For at least one convolutional layer, for each non-zero element in a kernel tensor, filter or matrix associated with the convolutional layer, instructions may be generated or issued. For example, for each non-zero element, a fused multiply-add (FMA) instruction (or another suitable multiply-accumulate instruction or group of instructions) may be generated. The FMA instructions may have as parameters or inputs a portion of the output for the convolutional layer, input data for the convolutional layer, and the non-zero element. The portion of the output for the convolutional layer may be represented as an FMA input or parameter as a register (in some embodiments two parameters may be used to represent this—the previously accumulated values, and the output); the input data for the convolutional layer may be represented as an FMA input or parameter as a register; and the non-zero element may be represented as an FMA input or parameter as a register or reference to a memory location. In some embodiments, the non-zero kernel element may be represented as an FMA input or parameter as a broadcast instruction taking kernel data from, for example, an external memory location. In some embodiments, the non-zero kernel element may be represented as an FMA input or parameter as a register which is filled by a vector broadcast instruction. For each non-zero element, a vector broadcast instruction to a register may be generated.

While in some embodiments, an FMA instruction is generated, any other suitable processing instruction (e.g. add and multiply or multiply-accumulate) or set of instructions may be generated for each non-zero element of the sparse kernel, filter or tensor.

The software or code produced may be executed during convolutional operations, for example as part of a larger application such as a NN inference application.

During convolutional layer calculation, if the computations related to the zero elements are never performed, the overall computation may be reduced, improving NN inference: e.g. a NN may execute the multiplication if the data entry is non-zero, and do nothing if it is zero. The data or kernel size may also be reduced, as in some embodiments zero elements of a kernel may not be stored associated with code. While code size may be increased as compared with traditional convolutional operation code, when the number of zero elements is large, the increase in instructions may be greatly offset by the decrease in compute time, and the decrease in stored data size.

Analogous to matrix multiplication (e.g. as described in International Application PCT/US19/40537), embodiments of the present invention include a sparse convolution process to automatically generate ahead of the computation or inference, once the sparse kernels are known, the multiplication code for the computations of only the non-zero entries in the sparse kernels, and not generate any code for the zero entries. Embodiments may detect non-zero elements, store only those non-zero elements in data section of the compiled code, and encode offsets to data into the compiled instructions. In contrast to some embodiments of a matrix multiply implementation, convolutional kernels may include a spatial component such that each output value depends on input values which are spatially nearby each other, typically in a small square (for example, 3×3).

Embodiments may compute sparse-dense convolution when the zero and non-zero entries are stable and pre-determined, and where the same sparse kernels are repeatedly used (e.g. during inference across large sets of different input), without using (during inference) a branch instruction to detect zero or non-zero kernel elements, and without using indexing. In some embodiments, only the code for the non-zero entries is generated, and no code is executed at inference time for the pre-determined zero entries. The resulting code may be "sparse" in that only non-zero kernel entries result in code instructions being generated. The same sparse kernels may be repeatedly used, by generating the code executed for the non-zero entries and no code for the zero entries, and then reusing this code many times.

The sparsity (e.g. the zero entries) may be a result of a pruning process of the neural network.

The instruction representation may be shortened relative to standard instruction length in order to increase arithmetic intensity. If the resulting code is executed on a CPU it may utilize its registers and caches by storing and executing only the instructions corresponding to non-zero entries.

Such methods may be used with a "pyramid" method of inference on a NN.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1A:
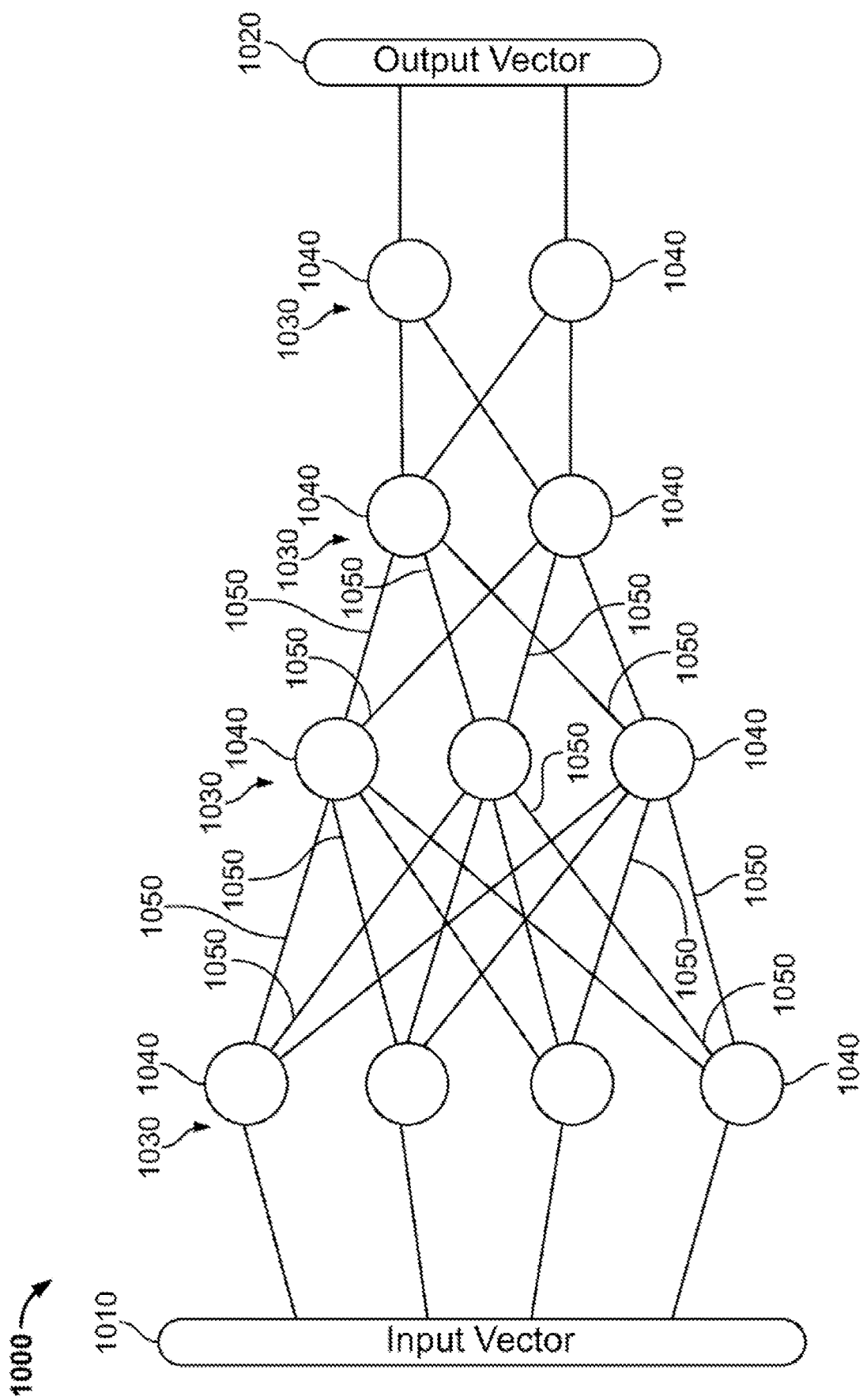
FIG. 1A is a block diagram of a neural network according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may automatically create code or software for use by a NN execution computer for efficiently executing convolutional calculations, for example in NN inference, after for example pruning data structures such as the tensors or matrices or NNs.

A convolutional operation may take as input a kernel A (e.g. a filter, which may be sparsified) and, input B (e.g. input to a NN, or input from a layer, which may be considered a dense input, a dense input signal, features, etc.) and produce output C, in a convolutional layer calculation denoted as A ⊛ B=C. Typically one multi-dimensional tensor A is iterated over windows of input B. A ⊛ B=C may be carried out by a set of mathematical (e.g. add and multiply) operations. Each of A, B and C may be tensors. (While in some embodiments, tensors are operated on, such operations may be considered to take place over matrices). Tensors may be considered to be multi-dimensional data structures; for example the special case of a matrix can be considered to be a two-dimensional tensor. Tensors may be stored as for example a list of numbers organized by one index per dimension. Dimensions may be given in "major order" (e.g. the first dimension changes the slowest and the last dimension changes the fastest). While in some representation the channel dimension is the last dimension since in some calculations channel changes the fastest, channels may be in some notations the first dimension, not the last dimension. While data is described herein as being organized as tensors, other data input and output of a convolutional calculation may be used, such as matrices.

Embodiments of the invention may automatically generate ahead of the computation, once sparse convolutional data is known, the multiplication code only for the computations of the non-zero entries in the convolutional data, and not generate any code for the zero entries. Producing this code from a compiler may include analyzing (e.g. by a processor) the convolutional data ahead of the computation and properly laying out the sequences of registers and FMA instructions that need to be executed. A process may generate machine code directed to a specific architecture. Code, instructions or software may be generated or emitted, which then may be used when executing a CNN. For each non-zero element in a kernel tensor or matrix part of the convolutional layer, instructions may be generated or issued. A series of nested loops may fix output entries (e.g. by having the outer loops iterate over entries of an output tensor having dimensions OC×OH×OW), and iterate over inputs (e.g. by having inner loops iterating over some or all dimensions of a kernel having dimensions IC (input channel)×OC (output channel)×KH (kernel height)×KW (kernel width), to calculate each output entry. For each non-zero element in a sparse kernel, instructions such as the following may be issued or generated (other or different instructions may be used):

A LOAD instruction loading from a consecutive series of memory locations which store an input to the layer of NN, to the next line-register (e.g. termed "L") in a circular queue of registers. The input may be for example an input tensor representing a feature map or input to a NN. A series of discrete values of the tensor may be loaded to the register.

Broadcast to a register a non-zero kernel element "e" that has been allocated to .data; the kernel data in .data may be stored with generated code or may be stored in external memory, and externally referenced based on a reference in the generated code. A vector broadcast instruction may place the same value at multiple places in a register. Such a broadcast instruction may be integrated with an FMA in some target architectures, and thus a broadcast instruction separate from an FMA need not be generated.

An FMA instruction or other multiply-accumulate or vector instruction having as parameters output (and possibly previously accumulated output); input data, and the non-zero kernel element. For example, an FMA instruction may have as parameters a register representing a portion of the output for the convolutional layer; register L; and a register holding e, such that the output register=the output register+L times the register holding e.

After an inner loop completes (e.g. after one inner loop iteration over some or all of IC×OC×KH×KW), a store instruction saving the output register may be generated (thus, during execution or inference, after a series of instructions generated by an inner loop completes, a store instruction may execute). The software or code produced may be executed during convolutional operations, for example as part of a larger application such as a NN inference application. The emitted or produced instructions may be strung together to produce a code segment or block for the convolutional calculation of the layer using the specific sparse kernel, having within or associated with the code the non-zero kernel information, the code referencing and accessing a memory block holding the input to the layer or NN. In one embodiment, a method may iterate across a portion of a kernel tensor to access each element of the kernel tensor, and if an accessed element is not zero generate a multiply-accumulate instruction taking as input at least the accessed element.

Performing compute using registers, e.g. quickly accessible locations available to a CPU or core, typically speeds processing. Registers are typically small storage internal to a processor storing one or more words of data.

Code may be designed for a specific target architecture—e.g. a specific type of model of processor or CPU on which the produced code is to execute. Parameters may be determined or calculated affecting the production of the code, e.g. describing the dimensions of a produced output tensor. Such parameters may depend on characteristics of a target architecture, e.g. on the number of registers in a target architecture executing the computer instruction code.

In one embodiment, for each row of values which are outputs of the convolution, with a fixed spatial coordinate (e.g. an output coordinate may be held constant in the loops), $O\_1 \ldots O\_\{OC\}$, which it is desired to compute, a process may iterate over every input in the pre-image of O (e.g. those in the range $B[1 \ldots IC][OH \ldots OH+KH] [OW \ldots OW+KW])$. (A pre-image of an output (or set of outputs) may be the set of inputs whose value affects those output values.) For each such input value I, a load instruction of I to a register from a circular queue may be emitted. A process may then examine each of the OC kernel values which map I to some $O\_j$. For each j such that the corresponding kernel is non-zero, a process may store the non-zero kernel element, e, in .data and emit and FMA multiplying I with e and accumulate to $O\_j$ (or one FMA handling multiple such multiply-accumulate operations).

Auxiliary code may be emitted or produced around this core sequence of input Load and FMA instructions to iterate over each spatial output coordinate. Each non-zero kernel value may be used to compute each spatial output row, but embodiments of an algorithm may only write each non-zero value to .data once.

Embodiments may produce code to compute a convolution $A \circledast B=C$, where A is a sparse kernel tensor (e.g., a kernel matrix) with dimensions $IC \times OC \times KH \times KW$, known at compile time, B is a dense input tensor with dimensions $IC \times IH$ (input height) $\times IW$ (input width), unknown until runtime or inference, and C is a dense output tensor with dimensions $OC \times OH \times OW$. B and C may be considered feature maps, e.g. a set of values organized spatially (e.g. via height and width dimensions) and into channels (via a channel dimension; e.g. OC and IC may be channel dimensions). Feature maps might be inputs to the neural network as a whole, including as a representation of a human-viewable image, or they might be intermediate data in a NN, in which case they may have no human-understandable meaning. By definition of a convolution in some embodiments $OH=IH-KH+1$ $(IH=OH+KH-1)$ and $OW=IW-KW+1$ $(IW=OW+KW-1)$; other parameters are independent and may be given at compile time.

While in NN contexts, code produced by embodiments of the invention is used during NN inference (e.g. run time), in some embodiments, code produced may be used during certain training portions. The code that is produced may be executed for example on multiprocessor architectures. The multiplication in the context of convolutional neural network layers is typically between kernel tensors of values, which may be sparse because as being pruned extensively, and the tensor or matrix of inputs (or modified inputs) to a NN at a first layer or inputs to an intermediate layer of a NN. The inputs may be dense (e.g. the input data matrix is not assumed to be sparse, in other words, it is not assumed to have many entries that are zero). Inputs to a NN may be for example an image to be categorized, speech data to be analyzed, etc.; inputs to layers may also be intermediate values sent from a previous NN layer which is to be processed using convolutional operations.

Embodiments may include methods to avoid performing, at inference, unnecessary and costly operations associated with zero elements of data used in convolutional operations, such as branching instructions. This may be accomplished by developing from a sparse convolutional kernel data (e.g. represented as a tensor) executable code including only necessary multiplication operations on non-zero elements of the convolutional operations data.

In some applications, the zero and non-zero values in sparse kernel data are stable over time, and may be pre-determined as of compile or code-generation time. When the same neural network is executed on different inputs, the pattern, e.g. which multiplications are avoided by not being included in the compiled code because the corresponding element of the convolutional kernel data is zero, typically remains the same. Subsequent training typically does not change this pattern because the pruned weights remain zero, and their corresponding multiplications are avoided. Other weights may change, but their corresponding multiplications are performed. In other words, to update the sparse convolutional kernel data by changing the value of a non-zero weight, merely changing the corresponding value within the code is needed, and the code will continue to work properly for multiplying with the updated sparse data. Thus new sparse convolutional data with different non-zero values, but zeroes in the same place, may be used to modify only the .data section of already created code, avoiding recompilation. Even if some additional weights become zero, those multiplications can still be performed: the weights that were zero because of pruning remain zero after training, and the corresponding multiplications can still be avoided. Thus, revised or new data may not require the production of new code.

The same generated code may be used many times (e.g. many NN inferences), saving much time as each time the generated code is executed, less code is executed than if zeros were branched on or otherwise considered at execution time. The code generated may include an instruction representation which is shortened relative to standard instruction length and also which may increase arithmetic intensity (AI). The AI of code or an algorithm may be the number of compute operations it performs per byte fetched from, or stored to, a certain level of the memory hierarchy (e.g. shared cache or main memory).

Compiling or creating computer instructions or code corresponding to or based on the sparse data may be performed in such a way that it can be executed efficiently on modern multiprocessors. On a given multiprocessor, the maximum amount of computation that can be performed per cycle is fixed, hence efficiency is measured by compute utilization, e.g. a fraction of the time spent on actual computation on a given piece of data as opposed to the time spent accessing that piece of data from memory. In order to achieve high compute utilization on modern multiprocessors (including both CPUs and GPUs), vector processing instructions may be used, such as fused multiply-add (FMA), that operate on multiple items or words of data simultaneously.

An embodiment may convert the convolutional kernel data into executable code, which contains a floating-point multiply-add instruction such as an FMA instructions for each non-zero element, and typically no FMA instruction or other instructions for zero elements in convolutional kernel data.

Unlike previous approaches in which the compiled code stores addresses of elements, embodiments may store each value of the non-zero element of the convolutional kernel or other data within the code itself, or associated with the code, as a constant (for example in a dedicated .data section for such constants); typically embodiments do not store in produced code the zero elements of the convolutional kernel. Each FMA instruction then multiplies some non-zero value of the convolutional kernel by a set of consecutive elements of the input data. Each value that is read and broadcast is multiplied by more than one subsequent sets of elements in input data. This way relative inefficiency of reading/broadcasting is amortized among many efficient FMA instructions, that provide highest throughput possible on modern multiprocessor architectures. Further, zero values do not result in calculation instructions, branch instructions, or indexing at inference (if . . . then instructions are instead used at compile time). Indexing may be avoided in that to review an input convolutional kernel for data, indexing may need to be used: by compiling code that includes within or associated with the code itself certain input convolutional kernel data, the indexing for that data is not performed at execute time.

Converting the sparse convolutional kernel—which includes many zero data elements—to code, reduces the size of data for the kernel (typically holding NN parameters), since only the non-zero elements of the kernel are included within the code (e.g. in the .data store discussed herein). In some embodiments, 10-20 times less kernel data is included and/or distributed with NN code.

Embodiments may work on CPUs, GPUs, or other multicore computing devices. Embodiments may produce code such that NNs execute efficiently, e.g. such that the compute resources of the CPUs have a high utilization.

While FMA instructions may provide high throughput in terms of number of operations per performed per cycle, they also have substantial latency (e.g. time between invoking the instruction and having its result available). Therefore, to achieve high utilization embodiments may incorporate enough independent FMA instructions, that will be pipelined by the target processor, and utilize the high throughput of the FMA units.

Embodiments may improve processing and lead to significant speedups when used on multiprocessors for applications performing sparse-dense operations where the sparse data has a fixed or mostly fixed sparsity pattern.

Some multicore CPU processors include several layers of cache. For example, on some Intel many-core (e.g. desktop or server) processors a third level of cache, known as the L3 cache, is large and shared among all of a processor's computing cores. Other levels of cache, such as L1 and L2, are faster and private to a specific core. Some embodiments of the invention may take advantage of this relationship. While some specific embodiments are described in terms of L1, L2, and L3 cache levels as in Intel architectures, embodiments may work with other architectures with a hierarchy of shared and core-exclusive cache levels. For caches and memory, the compute-to-memory ratio (CMR) may be defined as the ratio between the system's maximal number of compute operations per second, and its memory bandwidth. For example X86 family CPUs may have an FMA instruction set that is an extension to the "Streaming SIMD Extensions" instructions which may perform fused multiply-add (FMA) operations that operate on long bit vectors, for example 128 bits, 256 bits, or even 512 bits. For example, a single 512-bit FMA instruction can be used to multiply 8 pairs of 32-bit numbers, and add another accumulator number to each product. Embodiments of the invention may use such instructions.

If the AI of an algorithm executed on some architecture is not higher than the CMR of some memory level on that architecture, the execution will be memory bound, e.g. bottlenecked on bringing the data in or out of that memory level. In such a case, the algorithm may behave as it were being executed on a processor capable of fewer compute operations per unit time. The ratio between the theoretical, and effectively achieved number of compute operations per unit time is equal to AI/CMR. This ratio may be described as the processor's utilization (typically at the given memory level). In order to fully utilize the CPU's computational power, the number of compute operations of an algorithm per item brought from or stored to a given memory level (e.g. main memory or cache) should exceed the system's CMR. One way to increase the AI on a modern CPU includes reducing or eliminating branching, conditionals, and indirection, and to execute the majority of instructions as FMAs.

Convolutions or convolutional components such as tensors may be partitioned (e.g. blocked), e.g. into subconvolutions. For example, a process may partition an output tensor C with dimension OC×OH×OW into subtensors each with dimension OC'×OH'×OW', perform subconvolutions to fully compute each subtensor, and combine the results into original output C. It may be important to observe that each compiled subconvolution operating on the same range of output channels j . . . j+OC' will access the exact same pattern of non-zero kernel elements, regardless of which spatial block is being computed. Thus, in one embodiment, a process should only perform such a compilation algorithm once per block of OC' output channels and re-use the compiled code for each spatial block, in order to avoid increasing up the memory footprint of the compiled code, which can be quite large.

Embodiments may consider the effects of particular blocking schemes, e.g. sizes of sub-tensors in each subtask, on the efficiency of the multiplication. Convolution may be efficiently parallelizable among many processors using or adapting a standard blocking technique, in which the sparse-dense convolutional calculation task is split into multiple sparse-dense sub-tensor multiplication subtasks. Each of these sub-tensors may then be performed (e.g. fully determine an output for) for example on a single processor, core within a processor, or thread. The sub-tensors may then later be combined into a larger tensor, the output of a convolutional calculation of the original tensor, using known methods. For example, tensor A (representing or including kernel parameters, weights or parameters) and tensor B (representing NN or layer input data) may each be divided into sub-tensors, which may be used for a convolutional calculation, and the results combined into an output C representing A in a convolutional operation with sub-tensor B. (If a pyramid scheme is used, recombination of tensors may be delayed until near the final NN layer, and the tensors of the initial and intermediate layers of the pyramid may never be combined).

Code generated for, and code generation for, divided tensors, may be affected and optimized as a result of blocking, e.g. parameters of the example code in Table (e.g. OC, OH, OW etc.) may be selected as the sizes of sub-tensors which can be part of a larger tensor.

Some embodiments may optimize tensor subdivision to work with a particular computer configuration that will execute the NN operations, taking into account for example register or vector configurations, instruction latency and/or other processor details. Blocking may include or cause determining parameters describing the dimensions of a produced output tensor, for example some of such parameters dependent on the number of registers in a target architecture executing the computer instruction code. A tensor calculation can be divided into sub-tensor calculations, according to a known blocking process, and blocking may be according to parameters created based on a target processor architecture. In one embodiment the tensor calculation of sparse tensor A and input tensor B may be divided into multiple tasks of where tensor A' (part of A) is multiplied by tensor B' (part of B). Each sub-tensor calculation may compute a convolutional calculation which may be denoted A'⊛B', the output being tensor C'. Multiple outputs C' may be combined according to known methods into a final result tensor C which is A⊛B. Typically, a processor for which code is generated may include multiple registers or vector registers each including a number of values such as floating point values, the number of values of a register being its size which may be termed S. A may be divided prior to code generation, B may be divided at run-time, and outputs C' may be combined to C. While the division of B and combinations of C' are effected at run time, (e.g. inference) although the code may be structured to effectively perform this division and combination prior to code generation.

In one embodiment, parameters or settings may be optimized based on the target architecture, the processor type on which it is intended that the code will be executed. A set of target architecture values or parameters (e.g. number of available registers, relevant cache size) may be used to determine blocking dimensions, which in turn may define the generation of code. For example, when blocking or dividing the output tensor for a CNN layer having dimensions OC×OH×OW into smaller tensors each having dimensions OC'×OH'×OW', OC', OH' and OW' may each be determined based at least in part on processor parameters. From a smaller output tensor C' having dimensions OC'× OH'×OW', OC', the size of A' may be derived to have dimensions IC×OC×KH×KW and the size of B' may be derived to be IC×IH×IW. In some embodiments, size parameters of kernel and input tensors may be derived from the parameters of the output tensor, e.g. from the formulas OH=IH−KH+1 and OW=IW−KW+1.

In one embodiment, a target architecture may have a certain number of vector registers, (as opposed to scalar registers) available for the processor, or available for each core of a processor (e.g. in one type of target architecture each core has an L2 and L3 register private to that core) e.g. 32 registers in one target architecture. A certain number of the vector registers (e.g. 5) may be allocated to a circular queue of registers, and the remainder, e.g. 27, may be allocated to output tensor values. In some embodiment, a number of the vector registers may be allocated to processor or core tasks separate from the convolutional calculation, and thus a smaller number than the total vector registers may be allocated to the queue and tensor outputs. From these constraints (which may of course differ in other architectures and with other allocations), OC' may be derived as being not more than the number of registers in the circular queue. OH' and OW' may each be set equal to the square root of half of cache size for the processor. In some embodiments, the KH, KW, and IC dimensions are not divided or blocked, and IH' and IW' may be derived from OC' OH' and OW'.

Typically, a target processor (e.g. intended to execute the produced code) has limited registers and cache size, and a convolutional process is typically performed using a processor's internal registers and cache for speed and efficiency. Parameters governing code creation may be created with this in mind.

Optimizing or creating parameters which are, in turn, used to partition tensors used in generating convolutional code may improve prior convolutional processes by spending the resources to determine an optimal tensor partition or division, or blocking, at compile time, rather than at compute, inference or execute time, improving inference speed. The non-zero elements of a sparse tensor may be moved (e.g. partitioned) to a data store within the code (e.g. .data) at compile time. During compile time data input and output tensors may be only "logically" partitioned, such that during runtime (e.g. execution, or inference) logical sub-tensors are accessed according to partitioning, but data for these tensors is typically not moved to partition the tensor during runtime. Typically, NN execution or inference is performed many more times than the compilation of NN code, and thus one compilation producing improved code results in a large amount of saved resources.

While some embodiments may utilize known subdividing (e.g. blocking) of tensor or convolutional calculation operations, such subdivision need not be used.

In one embodiment, a process following the example pseudocode in Table 1 (with comments starting with //) may be used as the core of a process to produce convolutional layer calculation code (e.g. convolutional layer calculation code or software 302, described herein), typically machine code for the relevant architecture, such as an X86 architecture. Other processor types may be used, such as for example AVX2 or AVX512 processors, e.g. provided by Haswell, Broadwell, Cascade and Skylake. In some embodiments, a specific processor may be designed, or specific instructions may be designed, to be used with an embodiment of the present invention such that the benefits of the invention are increased. While in Table 1 specific type of FMA, load and other instructions are used, other instructions such as other floating-point multiply-add instructions or multiply-accumulate instructions may be used.

The example code in Table 1 may produce code to perform a convolutional operation on input kernel A (with dimensions IC×OC×KH×KW), input (e.g. input to a NN, or input from a layer) B (with dimensions IC×IH×IW) to produce output C (with dimensions OC×OH×OW). Such produced code may perform such an operation on sub-inputs, using blocking, e.g. using as data A' and B' of larger tensors A and B. Other dimensions may be used for tensors or matrices, other blocking or division schemes may be used, and blocking need not be used. The example of Table 1 assumes the existence of a circular queue of size R_1 of vector "line-registers". In operation, the code produced by the pseudocode of Table 1 may use a processor's registers (e.g. vector registers), in a queue or circular queue fashion. A process may increment in circular fashion each register chosen from a circular queue, with registers retired back to the queue when their associated FMA or other instruction completes. Registers in a processor may be used for multiple purposes by such pseudocode or other code, such as broadcasting kernel values and floating point operations. A vector broadcast instruction may be integrated with an FMA or other multiply-accumulate instruction. Other specific operations to compile or generate code, different from those shown in Table 1, may be used:

TABLE 1

```
    Emit or produce code to loop over oh in 1 to OH // First two loops are executed during
inference
    Emit or produce code to loop over ow in 1 to OW by S // S = number of floating point
values in register of target architecture
    Emit or produce code to initialize output registers C_0...C_{OC} = 0 // E.g. a number OC
SIMD vectors may be initialized which store results to be stored in output tensor C;
        For ic in 1 to IC, kh in 1 to KH, kw in 1 to KW
            Let L be next line-register in the circular queue of R_l registers
            Emit or produce LOAD instruction to L of memory at B[ic][oh+kh][ow+kw] // input
SIMD vector; take S distinct scalar values from memory storing input
            For oc in 1 to OC
                e = A[oc][ic][kh][kw]
                if e is non-zero then: // e = the next non-zero element to visit
                    Reserve a place for e in .data, noting offset off, and copy the value of e to .data +
off
                    Emit or produce FMA instruction: multiply L with broadcast(.data + off) and
accumulate to C_oc // .data + off stores e
            End For
        End For
    Emit or produce STORE instructions of C_0...C_{OC} registers to respective memory at
C[1...OC][oh][ow] // Store output
    Emit or produce code to conditionally repeat the loop over ow if ow < OW
    Emit or produce code to conditionally repeat the loop over oh if oh < OH
```

Table 1 is used to produce inference or execution code, which has a structure, at its core, of a series of FMA and associated instructions surrounded by the loops defining the beginning of Table 1. Compiled code may have two nested loops (e.g. oh in 1 to OH and ow in 1 to OW by S) controlling and repeating the instructions. Other looping (e.g. for ic in 1 to IC, kh in 1 to KH, kw in 1 to KW) in the code in Table 1 occurs only during code production: the code produced simply performs the load, FMA and other instructions in the order it is created or emitted. During inference, in the code produced by the operations of Table 1, a large number of FMA instructions may execute, followed by an appropriate store instruction. Embodiments may run on hardware providing instructions to operate on vector registers each containing S floating point values. For example, embodiments which use the x86 architecture with AVX2 extension may have S=8. Thus, code during inference may loop over ow in 1 to OW by an increment of S, being the number of floating point values in the relevant vector register of target architecture.

A different section of code according to Table 1 may be created for each blocked output tensor, and the code may be combined with other blocks; certain blocks of compiled code may be repeated or re-used for different sub-tensors. In a "pyramids" embodiment, some code sections may complete execution, and execution of another NN layer may proceed in part, before other CNN code sections start execution.

In the pseudocode in Table 1, the loops of oh and ow in combination with the production of code to initialize OC registers may be an outer loop sequence over entries in an output tensor C, where the code fixes individual entries in C, and then produces values of the fixed individual entries. These outer loops may be outside inner loop iterating over dimensions of an input and a kernel or filter each associated with (e.g. used for the computation of) a convolutional layer. For example the loops "For ic in 1 to IC, kh in 1 to KH, kw in 1 to KW" and "For oc in 1 to OC" are inner loops producing code moving over tensors A and B. The outer loops (e.g. to OH and OW) may execute during inference, and the inner loops (e.g. to IC, KH and KW) may produce code which, during inference, executes.

Instructions may be generated such that data from input (e.g. a feature map or input to a NN) is loaded using a "LOAD" instruction or other suitable instruction to a register from a queue, e.g. a circular queue, of registers. If a non-zero element is found in an input kernel tensor, an FMA is generated for that element, and if an examined kernel element is zero, no FMA is generated for that zero element (and no reserving of a place for e in .data is performed, saving memory footprint of the resulting code). In some embodiments, more than one multiply-accumulate instruction or FMA may be generated for each non-zero element. Thus any conditional based on zero kernel elements, or zero detection, is performed at code generation: at inference no computing action takes place for zero kernel elements. The FMA may include a broadcast or other suitable instruction loading kernel data to a register which is a parameter of the FMA; such a broadcast instruction may be generated so that it is executed separately from the FMA. For example, a vector broadcast instruction may be to a register, the register input to an FMA instruction.

The code that is produced may have .data be part of it or associated with it. In one embodiment as code creation takes place, a dynamically sized vector is created storing each non-zero elements; at the end of the compile process this may be saved to a data block.

Typically the data in A is known at compile or code generation time but the data in B is only known at run (e.g. inference) time. B is typically a dense matrix.

Typically, if code generated is code that executes a sub-tensor as part of a blocking or partitioning, a different code segment may be generated for each convolutional calculation of A' and B' producing output C', and code may also be generated or integrated to, after the execution of the convolutional code, combine the results C' into one larger output C. Partitioning in the sense of dividing inputs may be done for a sparse tensor by appropriately placing data and instructions in or associated with generated code, and for run-time input data block, by generating instructions to access that input appropriately.

If blocking is used, different segments of compiled code may be produced, one for each of some of the blocked tensor sections; however some such compiled code may be re-used for different blocked tensor sections. E.g., if an OC parameter is divided, different code may need to be generated for each such divided tensor, but this may not be the case if OH and OW parameters are divided.

Tensor A may be the tensor of a trained kernel, representing for example weights. A' may be a subtensor of such a kernel in the cases where blocking is used, or may be the full kernel tensor. If subtensors are used, the products of the sub-convolutional operations may be combined using known blocking methods into a larger output. Typically, no code is created for zero elements of A', obviating the need for a conditional or other instruction based on a zero entry in a tensor, and resulting at run-time (e.g. inference or learning in NN applications) of no code being executed or existing for the zero entries. In one embodiment the determination of whether a value is zero (e.g. "if e is non-zero then") is performed at compile time, by checking if an element of the convolutional kernel is zero, and if yes doing nothing, and if no, generating code for that element.

Figure 1B:
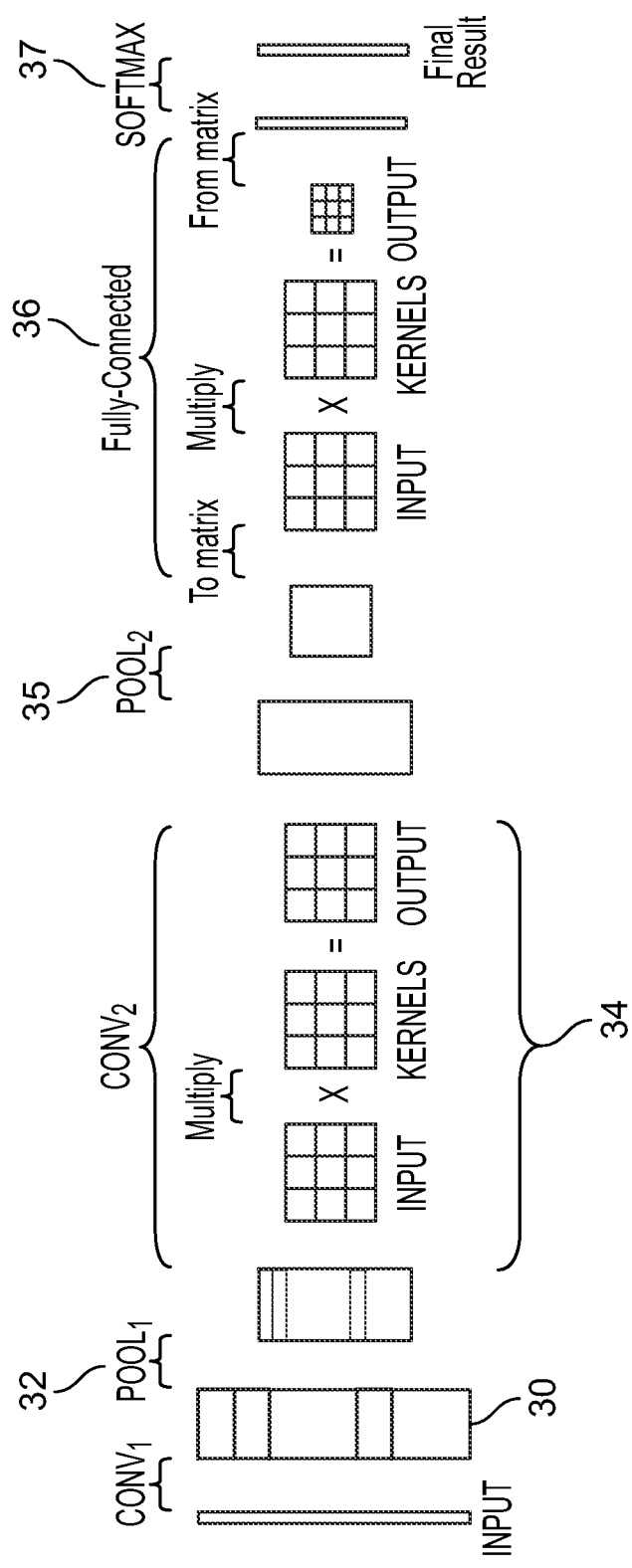
FIG. 1B is a block diagram of a neural network according to an embodiment of the present invention.
Figure 2:
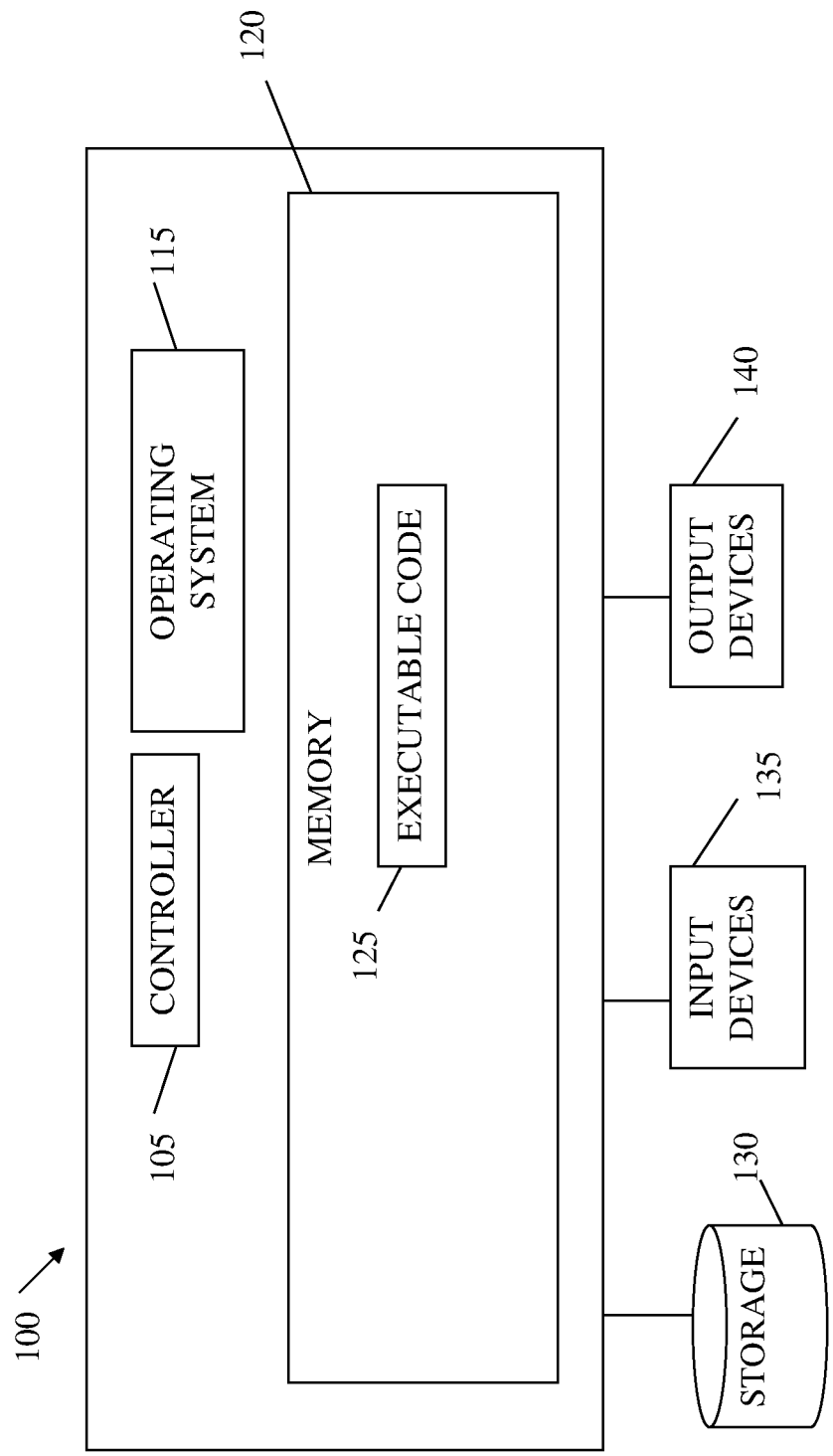
FIG. 2 is a high-level block diagram of an exemplary computing device which may be used with embodiments of the present invention.
Figure 3:
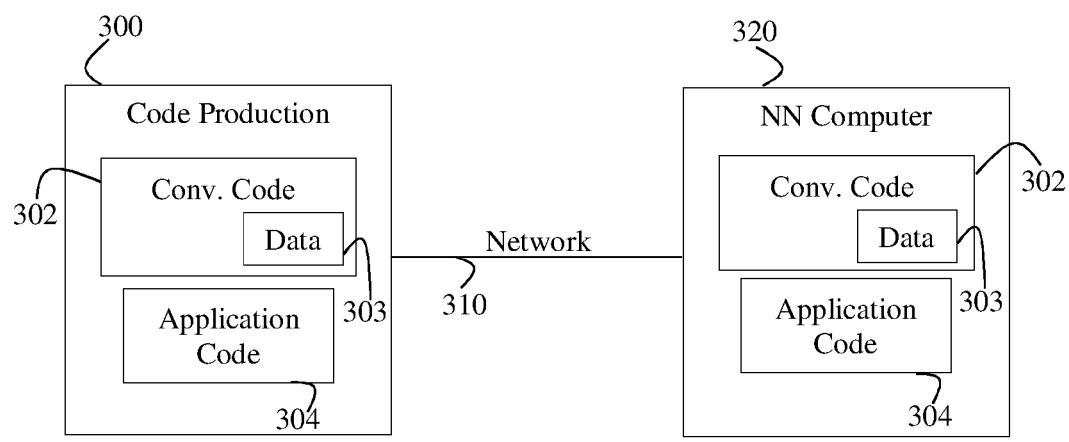
FIG. 3 is a high-level block diagram of an exemplary computing system which may be used with embodiments of the present invention.

The algorithms and methods described with the systems of FIGS. 1-3; however other specific systems may be used.

FIG. 1A is a simplified block diagram of a NN which may be operated on or computed according to an embodiment of the present invention; in typical use thousands of neurons and links are used. In one embodiment software or code generated simulates the operation of NN 1000. NN 1000 may input data as for example an input vector or tensor 1010 of values (representing, e.g. a photograph, voice recording, or any sort of data). NN 1000 may have neurons arranged into layers 1030, each including neurons 1040 connected to other neurons by links or edges 1050. NN 1000 may input data, for example an image (e.g. an input vector, tensor, matrix or other data) and may produce an output of signals or values, for example output vector 1020, which may for example indicate the content of or a description of the image. Other input data may be analyzed. NN 1000 may in one example have layers such as convolution, pooling, output layers, an FC layer, a softmax layer, etc. Each layer may connect to other layers by links or edges.

FIG. 1B shows an example of a CNN with a sequence of layers including convolutional layers. NN 20 includes direct convolutional layer 30, pool layer 32, and convolutional layer 34. Layer 35 may be a pool layer, layer 36 may be a fully connected, or for example a convolution, and layer 37 may be a softmax layer (softmax being a function that may be used in some NN layers). One or more cores or processors may process the NN during inference (e.g. run-time) by, e.g. simulating the activity and data flow of the nodes or neurons and layers, which may include tensor or matrix multiply and convolutional calculations.

The NNs in FIGS. 1A and 1B are typically simulated, and represented as data, for example by systems such as shown in FIGS. 2 and 3, using code such as generated by methods described herein. While specific numbers and types of layers are shown, FIG. 1A is merely a highly generalized example, and FIG. 1B is merely an example: NNs used with embodiments of the present invention may vary widely as known in the art.

FIG. 2 shows a high-level block diagram of an exemplary computing device which may be used with embodiments of the present invention. Computing device 100 may include a controller or processor 105 that may be or include, for example, one or more central processing unit processor(s) (CPU), one or more Graphics Processing Unit(s) (GPU or GPGPU), a chip or any suitable computing or computational device, an operating system 115, a memory 120, a storage 130, input devices 135 and output devices 140. Each of modules and equipment such as code production computer 300, NN computer 320, NNs as shown in FIG. 1 and other modules or equipment mentioned herein may be or include, or may be executed by, a computing device such as included in FIG. 2, although various units among these entities may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may when executed cause the production or compilation of computer code, or application execution such as NN execution or inference, according to embodiments of the present invention. Executable code 125 may be code produced by methods described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code.

Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. may be stored in a storage 130 and may be loaded from storage 130 into a memory 120 where it may be processed by controller 105. In some embodiments, some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 3 is a high-level block diagram of an exemplary computing system which may be used with embodiments of the present invention. Code production computer 300 may produce convolutional code or software 302 for use in inference for NNs, or may produce code for other applications using tensor or matrix multiplication. Convolutional code or software 302 may include or be associated with sparse data 303, e.g. the non-zero entries from an input dataset, tensor or matrix. Code 302 may execute sparse-dense multiplication as described herein, and may be executed in conjunction with, or may be combined with, application or NN code 304 such as TensorFlow or PyTorch open-source code, which may perform known operations for inference (e.g. runtime) for NNs. Application code 304 may interface with code 302, where code 302 may when executed handle certain tensor or matrix operations, and code 304 may handle other aspects of NN inference as known in the art. Application code 304 may interface with code 302 to for example execute or train NNs such as shown in FIG. 1. Code 302 if used for another application may include other code managing such an application; in such a case code 304 may manage such other non-NN applications.

Code production computer 300 may communicate, e.g. via a network 310 (e.g. the internet) with NN computer 320. NN computer 320 may train and or execute (e.g. inference) a NN by using (e.g. executing) code 302 and/or code 304. In some embodiments NN computer 320 may manage execution of a NN in cooperation with other computers, e.g. a cloud server, or a set (e.g. pod) of servers or computers, such that part of code 302 and/or code 304 may be executed by another computer separate from or remote from computer 320.

While code 302 is shown existing at code production computer 300, in some embodiments code production computer 300 may produce NN code 304, and deliver to another computer such as NN computer 320 which may integrate or use code 302 with code 304, where code 304 is not produced at code production computer 300. Code production computer 300 and NN computer 320 may be, be executed by, or include, elements of a computer such as shown in FIG. 2.

Figure 4:
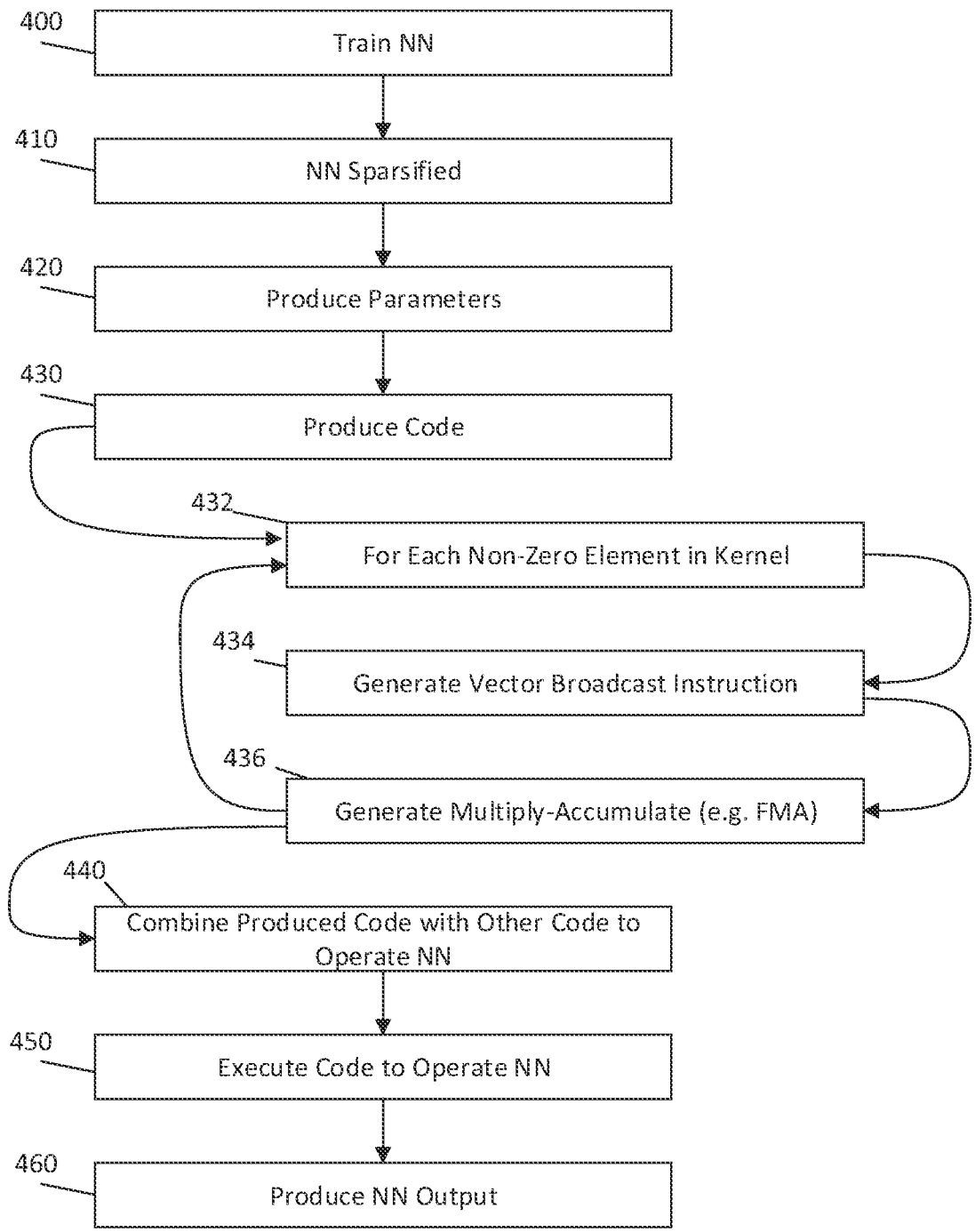
FIG. 4 is a flowchart of a method according to embodiments of the present invention.

FIG. 4 is a flowchart of a method for producing or compiling code and/or executing an application such as NN inference according to embodiments of the present invention. While in one embodiment the operations of FIG. 4 are carried out using systems as shown in FIGS. 1-3, in other embodiments other systems and equipment can be used.

In operation 400 a NN may be trained to produce a set of parameters, e.g. link weights.

In operation 410, the NN may be sparsified through known methods such as pruning, such that many non-zero link weights are converted to zero. For example parameters of the NN may be sparsified. Data that has been produced and sparsified, e.g. NN parameters, may be placed in a sparse tensor or matrix. Alternately, a produced tensor or matrix may be sparsified.

In operation 420, optimization parameters may be produced using as input parameters or factors specifications of a target processor, e.g. the size of caches local to cores, the number and division of available vector registers, or other specifications. Output of optimization may be for example parameters to determine a blocking operation, dimensions of input or output tensors or sub-tensors used, the number of registers, typically vector registers, used for convolutional operations, and/or the size of a pool or a queue that includes registers used for convolutional operations.

In operation 430, code or software (e.g. tensor or matrix code 302) may be produced using as input a tensor or matrix produced in operation 410 and possibly optimization or optimized parameters. Such code may be produced for at least one convolutional layer of the NN. For example, a process as in example Table 1 above may be used; however other embodiments may use other specific processes. The code produced may be tensor operations or matrix multiply operations designed for a specific processor (e.g. target architecture) with specific parameters. For example, in operation 432, for each non-zero element in a kernel or tensor associated with (e.g. to be applied to as part of the convolutional operation) the convolutional layer, a process may be performed; if the element is zero the process may be avoided or not performed.

Operation 432 may use an if-then or other conditional operation such that such an operation is performed at code generation time rather than inference time. This process may include in operation 434, emitting or generating a vector broadcast instruction broadcasting the non-zero kernel entry to a register and in operation 436, emitting or generating a vector or multiply-accumulate instruction such as a floating-point multiply-add instruction. Such an FMA instruction may have for example three or four parameters, e.g. an output (e.g. a portion of an output for a convolutional layer), previously accumulated output, non-zero kernel data, and input data. Output and previously accumulated output may be combined to one parameter. Non-zero kernel data may be for example a register to which data was broadcast, a memory reference for kernel data, or a broadcast element itself. Input data (e.g. feature, image, or other data) may be a memory reference or register. Instead of a parameter being a register containing the kernel data, a parameter being a reference to external memory containing the kernel data, or a broadcast instruction for the broadcast instruction, may be used. Other suitable instructions or groups of instructions for calculating a convolutional layer, other than an FMA, may be generated based on a determination that a kernel entry is non-zero.

Operations 432-436 may be iterated a number of times until for example no unvisited (e.g. unprocessed) non-zero elements remain. Operation 432 may use nested loops, iterating over elements in input and output tensors.

Generating or compiling code as in operation 430 may partition or divide a sparse tensor or matrix in the sense that the non-zero elements of the sparse tensor or matrix are distributed appropriately in a data store in the resulting code, or that instructions may access the data in a manner effectively partitioning the data. The sparse tensor A may be blocked, partitioned or divided in this virtual sense by, for example, generating a separate set of convolutional code for each partition of tensors A', B' and C'; code may also be generated to combine the results C' tensors after calculations are performed. However typically these tensors are not actually partitioned in the sense that data is not moved to divide the tensors.

A separate section or block of convolution code may be created for each certain different section of blocked tensors.

In operation 440, code produced in operation 430 may be combined with or integrated with other code used to operate an application, e.g. code to operate a NN, to produce a complete or combined set of code (e.g. tensor code 302 and application code 304) which may be used to, e.g. perform inference on a NN. In some embodiments, combination need not take place; rather the two sections of code may operate in conjunction with one another without being combined. Code may be generated or added to control the execution of the tensor code a number of times, for each of the sub-tensor/sub-input pairs, and after the execution of the convolutional code, combine the results C' (e.g. multiple target tensors) into one final output tensor. As part of operation 440, code produced in operation 430 and/or combined code, may be distributed or transmitted from a production computer to a computer used to execute the code. The code produced may include or be associated with the sparse kernel data—e.g. only non-zero entries of the original kernel, which included many zero entries, may be associated with the code.

In operation 450, code or software produced, combined and/or distributed (e.g. at least in part tensor or matrix code 302) may be executed, possibly in combination with or while communicating with other code used to operate an application, e.g. code to operate a NN (e.g. application code 304). For example, one or more computers conducting NN inference, e.g. computer 320, may execute tensor operations, matrix multiply and other NN code, possibly having some execution take place on remote (e.g. "cloud") computers. Such execution may include, for example, tensor or convolutional operations or multiplication of matrix data, such as data in data 303, by NN input data which is also represented by a tensor. Execution of such code may include controlling the execution of the tensor multiplication code, and combining the tensor results into one output tensor. Data used as input may be input to a NN, or intermediate values sent from one NN layer to another. Executing the NN may include, for at least one convolutional layer of the NN, executing the series of instructions (e.g. including FMA instructions) created, each FMA instruction taking as input a non-zero element of the filter or kernel tensor associated with the convolutional layer, the series of FMA instructions associated with the data store holding only non-zero elements of the kernel tensor. Executing the NN may include executing a vector broadcast instruction to a register, the register input to an FMA instruction. A set of instructions may be executed to combine more than one produced output tensor into a final output tensor. In a "pyramids" embodiment, during execution of the CNN, at least a first code section may be executed in conjunction with code executing at least a portion of a lower CNN layer before the execution of a second code section.

In operation 460, a result or output may be produced by the executed code, e.g. via a NN, e.g. a classification of data.

Other or different operations may be used.

Embodiments may apply methods as described herein— e.g. producing code for sparse convolutional operations— with a pyramidal processing approach. Such a "pyramid" approach is described in embodiments of U.S. patent application Ser. No. 16/426,609, filed on May 30, 2019, entitled "SYSTEMS AND METHODS FOR IMPROVED NEURAL NETWORK EXECUTION", incorporated herein by reference in its entirety. Pyramid processing embodiments may execute the layered graphs defining CNNs on multicore CPUs that typically have large caches and low memory bandwidth. Pyramid embodiments may divide computation into tasks in a manner that can be agnostic to the layered structure of the network, breaking the whole network (or substantially the whole network) down into asynchronously executable "pyramid" shaped tasks that can cross layer boundaries. Each task can be executed by a single compute core, encompassing a part of the computation that can optimize the cache and/or compute capabilities of this individual core. One benefit of this approach can be to reduce the amount of data brought to memory at any given time so that it can be proportional to the total amount of core cache memory, rather than the size of a given network layer. Another benefit of this approach can be that it can also turn computations that are memory bound into ones that are compute bound for the most complex convolutional computations. This can speed up the execution of CNNs on CPUs considerably because, for example, it can allow them to overcome their inherent limited memory bandwidth. Element-wise computations in a CNN can be ones in which the inputs needed to compute a given output value typically do not overlap with the inputs required to compute any other output value.

Unlike prior methods, a pyramid embodiment (and its resulting savings) may be applied to all (or substantially all) types of computation in a CNN, and in particular to non-element-wise operations such as those in convolutional layers. Embodiments may execute the tasks efficiently even though they may overlap with one another in the computations they perform. This can allow an asynchronous execution of a complete CNN, in training and/or inference modes. Pyramid embodiment processing may break with traditional or prior art GPU style executions of such networks, which, apart from fusing the computation of a few types of element-wise layers (such as pooling and ReLU), are typically based on executing the computation layer after layer with multiple cores executing a complete layer in a synchronous or bulk-synchronous fashion. Moreover, unlike prior approaches, the computation of some embodiments, within each pyramid task, can allow maximizing cache buffer reuse and/or reduction of memory bandwidth traffic, which can allow great savings in the amount of overall memory that needs to be used at any given point in the computation (e.g. a process may not need to store a whole layer's data in memory at the same time). This property can be a critical component enabling efficient execution of sparse CNNs.

A pyramid embodiment can execute a CNN computation graph as a collection of "pyramid" tasks, each executing a subset of the neurons or nodes across several layers, rather than just a subset of the nodes or neurons of a given layer. In a CNN the subset of network nodes can form an abstract shape of a pyramid; hence the name. The choice of neurons executed in each pyramid task can be designed to (1) fit the computation of the task, e.g. perfectly, into the cache of a computing core executing it, and thus minimize the number of times data must be moved from the cache into and out of memory, (2) maximize the utilization of computing cores by load balancing them across the depth of the computation graph rather than across a given layer, and (3) reduce the amount of data that needs to be brought to memory at the same time from being proportional to the size of a layer to being proportional to the size of the sum total of the processors' cache sizes.

Each task can be a set of compute instructions with a set of inputs that are dependent on prior tasks and an output that will feed into subsequent tasks. The nodes or neurons in a task can be chosen so as to minimize the amount of data moved during the computation, allowing, for example, to repeatedly swap data within the same regions of cache, in order to make a task execution completely compute bound, that is, spend most of its time computing on the same data rather than on bringing new data from memory. This non-layered pyramidal approach can differ from prior art approaches where one waits for the completion of the computation of all the nodes or neurons of a given network layer before proceeding to compute the following layer, typically incurring large penalties because of memory traffic. A component of a pyramid task may be a block of code which executes a part of a convolutional layer (e.g. as produced by the example Table 1 process), the block of code executed in sequence with other components of the pyramid task before other blocks of code for the CNN layer are executed.

In a pyramid implementation, a first set of tasks may output to a second set of tasks which may output to a third set of tasks. For each output an algorithm may recursively move back in the layers, aggregating the sub-computations necessary to compute this single output. An algorithm may determine the inputs required for an ultimate output by taking the union of the inputs needed for each sub-computation. Next, all the computations needed to create the inputs to a certain task (which are the outputs of other tasks), may be aggregated into a new set of pyramid tasks that each are calculated backwards to include re-shuffle, pooling, and convolutional computation. After, in turn, each of the inputs to a task may be computed via a new set of pyramidal tasks that span the pooling and convolution layers.

In one example approach, when used with a VGG-type network, the first convolutional layer of a VGG NN may take a two dimensional input image with dimensions 224×224 and with three input channels (RGB). The output of the layer has 64 channels, and hence, there may be 64×3 convolutional kernels each of dimensions 3×3. With padding 1 and stride 1 along each dimension this may lead to an output of the same dimensionality 224×224 but with 64 channels. After applying the rectified linear unit (ReLU), this is then fed as input to the second convolutional layer, which has the same number of 64 output channels (as the input channels), and the same padding and strides as the first layer.

Hence, the output of the second convolutional layer is again 224×224 with 64 channels. This is then passed through a ReLU and a max-pooling of 2×2, reducing the dimensionality to 112×112. The next, third, convolutional layer has 128 output channels, but the same padding and strides as before that leaves the dimensionality of the output also 112×112 with 128 channels. The fourth convolutional layer follows after a ReLU, with same padding and strides and 128 output channels. Finally, a second max-pooling occurs after another ReLU.

On an AVX2 architecture, an embodiment may be able to create a pyramid task that starts at the beginning of the network and ends after the third convolutional layer. This follows from the above calculations, as a process can afford 64 input and output channels in operations of the second convolutional layer. Even though it does not make a difference in this particular example, in this context, the amount of computation is actually increased substantially, giving even more leeway in terms of the CMR requirements.

Figure 5:
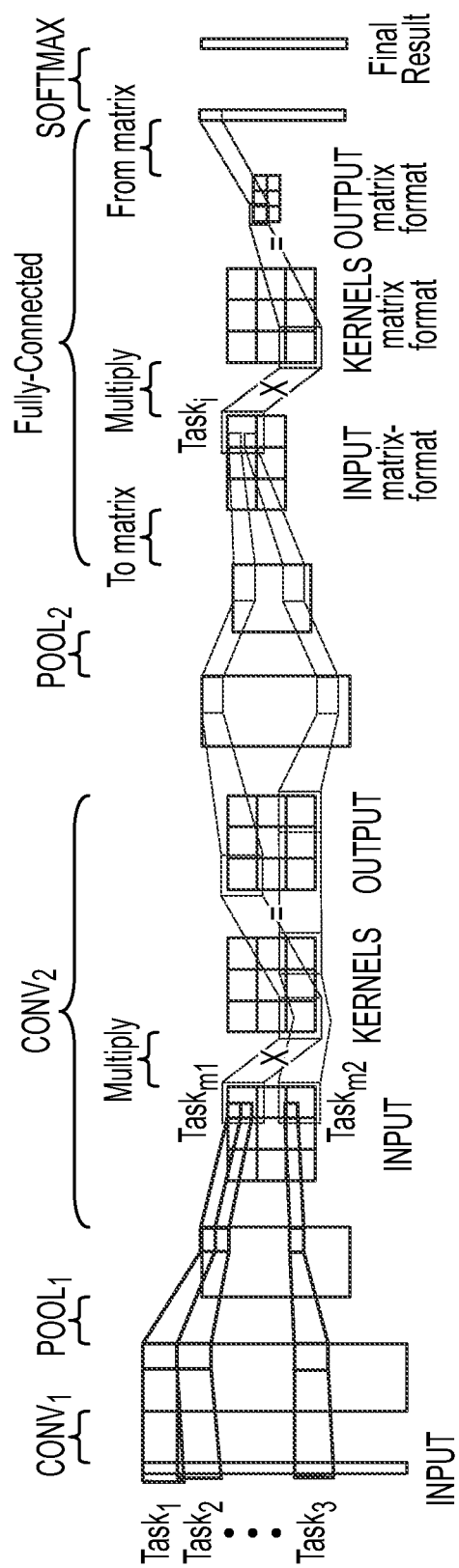
FIG. 5 is a simplified schematic diagram of a CNN having a number of sub-computations (e.g., tasks) spanning more than one layer of the CNN, according to some embodiments of the invention.

FIG. 5 is a simplified schematic diagram of a CNN having a number of sub-computations (e.g., tasks) spanning more than one layer of the CNN, according to some embodiments of the invention. A number of sub-computations, $Task_1$, $Task_2$, . . . , $Task_N$, $Task_{m1}$, $Task_{m2}$, $Task_i$, span across multiple layers. During execution, $Task_1$, $Task_2$, . . . , $Task_N$ can be executed in parallel or asynchronously. $Task_{m1}$ can execute as soon as $Task_1$, $Task_2$ output is ready. $Task_{m2}$ can be executed as soon as $Task_N$ output is ready. $Task_{m1}$, $Task_{m2}$ can execute at different times. In this manner, execution of the CNN layer by layer can be avoided; combinations of portions of layer executions, combined across layers, can be executed in conjunction, one portion of a layer execution providing output to another portion in another layer being executed in conjunction with the first portion.

The plurality of sub-computations $Task_1$, $Task_2$, . . . , $Task_N$, $Task_{m1}$, $Task_{m2}$, $Task_i$, can be determined prior to execution. The plurality of sub-computations can be determined recursively for example by moving back from a portion of the Softmax layer output 510 and aggregating the sub-computations that are required to produce the Softmax layer output 510. As can be seen in FIG. 5, $Task_i$ traverses back and aggregates all outputs/computations from Softmax layer output 510, through Fully-Connected reshuffle layer and a stops in the Fully-Connected matrix multiply, which indicates that in this example the Fully Connected matrix multiply layer is when the outputs reach a memory size that reaches a memory threshold. All of the outputs/computations needed to create the inputs for $Task_i$, which are the outputs of $Task_{m1}$, $Task_{m2}$ are considered. $Task_{m1}$, $Task_{m2}$ each traverse back and aggregate all outputs/computations from Fully-Connected re-shuffle, pooling, and convolutional computation. All of the outputs/computations needed to create the inputs for $Task_{m1}$, $Task_{m2}$, which are the outputs of $Task_1$, $Task_2$, $Task_N$ are considered. $Task_1$, $Task_2$, $Task_N$ each traverse back and aggregate all outputs/computations from a portion of the pooling and convolution layers, which indicates that the memory threshold has not been met and all computations from all layers have been added to the sub-computations.

One embodiment may analyze a NN to determine a plurality of sub-computations from total computations of the neural network, where determining each sub-computation includes determining a group of outputs for each sub-computation based on a layer of the NN; and for each group of outputs, determining a largest number of inputs in some layer that precedes the one layer that are necessary to compute the respective group of outputs and results in a memory requirement less than a memory threshold. At least two of the largest number of inputs for the respective sub-computation may overlap and span at least two layers of the plurality of layers of the neural network. The outputs of the neural network may be computed by executing each sub-computation.

In some embodiments, a "blocked" convolutional calculation, where different portions of a convolutional layer are divided based on the division of tensors into tasks, each task including one or more code segments such as code generated by a process such as in Table 1, may be integrated with a "pyramid" process. Different portions of the convolutional calculation may be integrated into a pyramid task, such that some portions of the convolutional calculation may be calculated with an associated pyramid task before other convolutional portions are calculated. In such a manner, layers lower to (e.g. accepting input from a prior layer) the convolutional layer may be partially calculated before all convolutional portions for the convolutional layer are calculated: some convolutional portion calculations may be delayed while pyramid calculations including other convolutional portions are calculated. In one embodiment of a pyramids-sparse CNN combination, a number of code sections for the at least one convolutional layer may be produced, such that during execution or inference of the CNN, at least a first code section is executed in conjunction with code executing at least a portion of a lower CNN layer before the execution of a second code section of the convolutional layer.

Embodiments of the present invention may improve prior NN inference by for example avoiding completely both certain convolutional layer operations involving zero parameters and also, at inference, branch operations (e.g. if zero then do not multiply) which may attempt to avoid such zero operations. In prior art systems, a kernel—e.g. describing a filter, a set of weights or other parameters—may be combined with NN code such as TensorFlow or PyTorch open-source code, which may take input data and perform inference on the NN which may include convolutional kernel calculations, or tensor or matrix multiplication, of zero entries in the kernel, or branch operations to avoid multiplication on zero items. In contrast, embodiments of the present invention may include only non-zero kernel values in compiled code, and only operations to perform multiplication operations on those non-zero kernel values in the compiled code. Thus, unlike prior art NN architectures, code specific to a NN may be compiled specific to a kernel or set of parameters.

Embodiments of the invention may be applicable to NNs computed with any sort of nodes, e.g. CPUs, GPUs, or other types of processors.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of generating computer instruction code for executing a convolutional neural network (CNN) comprising one or more convolutional layers, the method comprising:
   determining parameters describing the dimensions of a produced output tensor, at least one parameter dependent on a number of registers in a target architecture executing the computer instruction code; and
   for at least one convolutional layer:
   for each non-zero element in a kernel tensor associated with the convolutional layer generating a fused multiply-add (FMA) instruction having as parameters a portion of the output tensor for the convolutional layer, input data for the convolutional layer, and the non-zero element.

2. The method of claim 1 wherein:
   the portion of the output for the convolutional layer is represented as an FMA parameter as a register;
   the input data for the convolutional layer is represented as an FMA parameter as a register; and
   the non-zero element is represented as an FMA parameter as a register or reference to a memory location.

3. The method of claim 1, comprising, for each non-zero element in the kernel tensor generating a vector broadcast instruction to a register.

4. The method of claim 1, comprising generating a set of instructions to combine more than one produced output tensor into a final output tensor.

5. The method of claim 1 wherein the operation of for each non-zero element in the kernel tensor generating an FMA instruction is performed within a set of nested loops, an inner loop iterating over 1 to OC, OC being a channel dimension of the produced output tensor, and loops outside the inner loop iterating over dimensions of an input and the kernel tensor.

6. The method of claim 1, comprising creating a plurality of code sections for the at least one convolutional layer, such that during execution of the CNN, at least a first code section is executed in conjunction with code executing at least a portion of a lower CNN layer before the execution of a second code section.

7. A system for generating computer instruction code for executing a convolutional neural network (CNN) comprising one or more convolutional layers, the system comprising:
   a memory and;
   a processor configured to:
   determine parameters describing the dimensions of a produced output tensor, at least one parameter dependent on a number of registers in a target architecture executing the computer instruction code; and
   for at least one convolutional layer:
   for each non-zero element in a kernel tensor associated with the convolutional layer generate a fused multiply-add (FMA) instruction having as parameters a portion of the output tensor for the convolutional layer, input data for the convolutional layer, and the non-zero element.

8. The system of claim 7 wherein:
   the portion of the output for the convolutional layer is represented as an FMA parameter as a register;
   the input data for the convolutional layer is represented as an FMA parameter as a register; and
   the non-zero element is represented as an FMA parameter as a register or reference to a memory location.

9. The system of claim 7, wherein the processor is configured to, for each non-zero element in the kernel tensor generate a vector broadcast instruction to a register.

10. The system of claim 7, wherein the processor is configured to generate a set of instructions to combine more than one produced output tensor into a final output tensor.

11. The system of claim 7 wherein the operation of for each non-zero element in the kernel tensor generating an FMA instruction is performed within a set of nested loops, an inner loop iterating over 1 to OC, OC being a channel dimension of the produced output tensor, and loops outside the inner loop iterating over dimensions of an input and the kernel tensor.

12. The system of claim 7, wherein the processor is configured to create a plurality of code sections for the at least one convolutional layer, such that during execution of the CNN, at least a first code section is executed in conjunction with code executing at least a portion of a lower CNN layer before the execution of a second code section.

13. A method for executing a convolutional neural network (CNN) comprising one or more convolutional layers, the method comprising:
   for at least one convolutional layer of the CNN:
   executing a series of fused multiply-add (FMA) instructions, each FMA instruction taking as input a non-zero element of a kernel tensor associated with the convolutional layer, the series of FMA instructions associated with a data store holding only non-zero elements of the kernel tensor;
   wherein the series of FMA instructions are generated by determining parameters describing the dimensions of a produced output tensor, at least one parameter dependent on a number of registers in a target architecture executing the series of FMA instructions.

14. The method of claim 13, wherein the series of FMA operations are generated by performing instruction generation operations within a set of nested loops, an inner loop iterating over 1 to OC, OC being a channel dimension of an output tensor produced by the series of FMA instructions, and loops outside the inner loop iterating over dimensions of the input and kernel tensor.

15. The method of claim 13, comprising executing a vector broadcast instruction to a register, the register input to an FMA instruction.

16. The method of claim 13, comprising executing a set of instructions to combine more than one produced output tensor into a final output tensor.

17. The method of claim 13, comprising executing a plurality of code sections for the at least one convolutional layer, such that during execution of the CNN, at least a first code section is executed in conjunction with code executing at least a portion of a lower CNN layer before the execution of a second code section.

18. A method of compiling computer code for executing a convolutional neural network (CNN) layer, the method comprising:
   determining parameters describing the dimensions of a produced output tensor, at least one parameter dependent on a number of registers in a target architecture executing the computer code;
   iterating across a portion of a kernel tensor to access each element of the kernel tensor; and
   if an accessed element is not zero generating a multiply-accumulate instruction taking as input the accessed element.

19. The method of claim 18, wherein iterating is performing within a set of nested loops, an inner loop iterating over 1 to OC, OC being a channel dimension of the produced output tensor, and loops outside the inner loop iterating over dimensions of an input and the kernel tensor.

20. The method of claim 18, wherein the multiply-accumulate instruction takes, as input, input data for the convolutional layer.

* * * * *